Nov. 17, 1925.

J. R. WOOD

MOLDING MACHINE

Filed Sept. 19, 1923

INVENTOR
JOHN R. WOOD
BY Parker W. Page
ATTORNEY

Nov. 17, 1925.
J. R. WOOD
MOLDING MACHINE
Filed Sept. 19, 1923
1,561,500
2 Sheets-Sheet 2
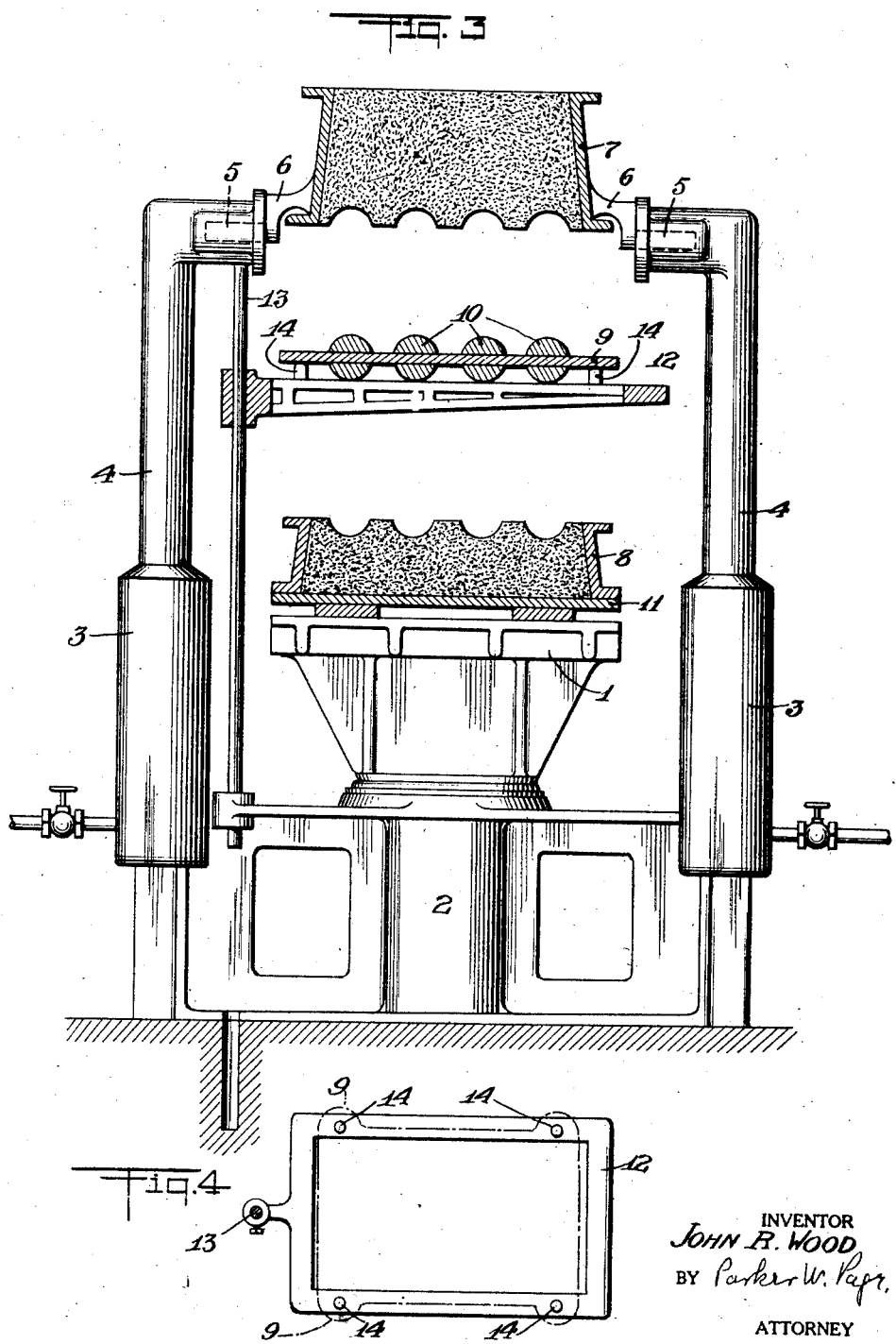
INVENTOR
JOHN R. WOOD
BY Parker W. Page,
ATTORNEY Patented Nov. 17, 1925.

1,561,500

UNITED STATES PATENT OFFICE.

JOHN R. WOOD, OF NEWARK, NEW JERSEY, ASSIGNOR TO NEW PROCESS MULTI-CASTINGS COMPANY, OF NEWARK, NEW JERSEY, A CORPORATION OF NEW JERSEY.

MOLDING MACHINE.

Application filed September 19, 1923. Serial No. 663,694.

*To all whom it may concern:*

Be it known that I, JOHN R. WOOD, a citizen of the United States of America, residing at Newark, in the county of Essex and State of New Jersey, have invented certain new and useful Improvements in Molding Machines, of which the following is a full, clear, and exact description.

In the process of molding from matched pattern plates, as heretofore practised, one side of the plate is made the bottom of a drag which is rammed by hand and inverted; the other side is made the bottom of a cope, is also rammed by hand, and after the removal of the plate this cope is assembled with the drag to form a mold contained in a flask which is then poured.

No practicable way has hitherto been devised for utilizing such a molding machine as is known as a jolt machine, for the production of molds by the use of such matched plates that does not follow this same process. In other words the drag member of a flask with one side of the matched plate forming the bottom is first placed on the machine and rammed. It is then removed, inverted, and the plate lifted, a bottom board secured to the drag, and the latter set aside.

Similarly a cope member of a flask is rammed by the machine, the plate lifted, and the cope associated with the drag to form the complete mold. No two flasks are exactly alike, however, and such differences in shape and size as exist or may result from use, frequently fail to produce a perfect mold, with the result that in all foundries where this or these plans are in use, a very material and often serious loss is met with in the number or proportion of defective castings.

It is the object of the present invention to avoid this loss, and to provide a process of molding any and all kinds of articles by the use of jolt machines and matched pattern plates, which is simple and highly efficient. I accordingly proceed as follows.

A single permanent flask is constructed for a given jolt machine, in two parts or sections, a drag and a cope section, the entire flask when assembled tapering up from the bottom of the drag, so that each section, when the mold is rammed, may be lifted off leaving the finished sand mold. To ram such a mold, the two flask sections are assembled with a matched pattern plate between them, and firmly secured together. The plate may be of any desired thickness, and the pattern on one side is designed to form one half of the mold up to the parting line, while the pattern on the other side forms the other half.

This flask is set in a frame supported and carried by the portion of the machine which is jolted, with the drag uppermost and the top of the cope resting on the table which is capable of vertical motion. The machine is then started in operation and sand supplied to the open drag which is packed or rammed. A bottom board is then secured to the under or wider side of the drag, the entire flask raised and turned to insert the flask, and then lowered until the drag bottom board rests on the table.

The cope section of the flask is then filled, packed or rammed, until there is produced a completely rammed flask with the interposed pattern plate. The drag section is rammed somewhat more solidly than would ordinarily be required, and I have found that when this is done there is no appreciable settling of the sand mold therein from the pattern while the cope is being rammed.

When the flask has been thus prepared the cope resting in the frame is released from the drag and raised. A frame which normally lies below the flask is then raised and pins or projections thereon engage with the edges of the pattern plate and lift the same from the drag. This frame with the plate is then swung to one side, and the cope lowered down upon the drag, bringing the sand which it contains directly down upon that in the drag and forming a perfect mold.

The cope member is then loosened from the mold and raised. Likewise the drag member is loosened and raised, leaving only the sand resting upon the drag bottom board. This is then removed from the machine and set in position where it may be enclosed in a temporary casing made of exactly the same interior dimensions as the flask, and poured. The flask and machine may then produce another mold, and in this way any number of perfect sand molds may all be produced on the machine from a single flask, securing perfect uniformity and exactness in the castings.

Such machines as my invention contemplates the use of are well known in this art, and will be illustrated herein only so far as may be necessary to an understanding of the improvement.

In the drawings hereto annexed,

Fig. 3 is a similar view showing the two parts of the flask separated and the pattern plate raised from the drag; and Fig. 4 is a view of the lifting frame which raises the pattern plate from the drag.

Figure 1:
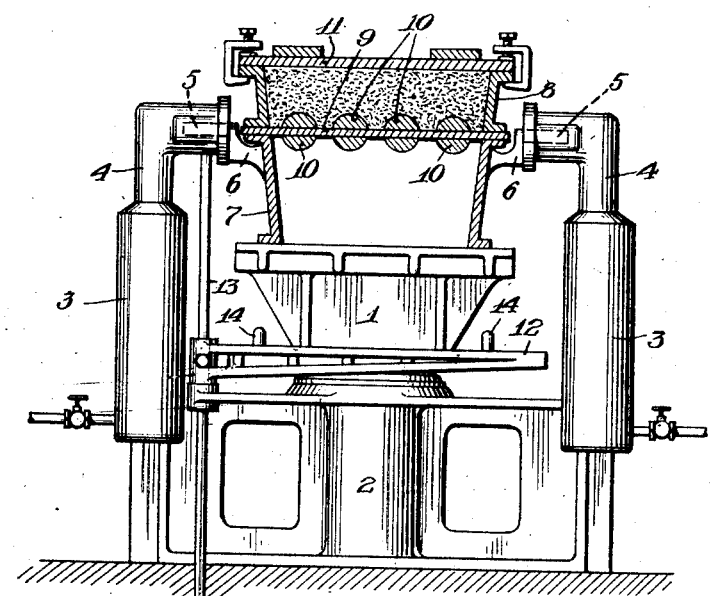
Fig. 1 is a view in elevation of a standard form of jolt machine, with a flask therein shown in section and inverted.

The machine as a whole comprises a table 1, which may be raised or lowered by a piston working in a cylinder 2. At each side of the table are the jolt cylinders 3, with their pistons 4, and to these pistons are secured the trunnions 5 of a frame 6, which receives the cope member 7 of the flask, of which 8 is the drag member.

The cope and drag members 7 and 8 are secured together with a pattern plate 9 between them. On the opposite sides of this plate are the half patterns 10, so that when the flask, inserted as in Fig. 1, is supplied with sand and jolted by the pistons 4, the drag member is packed. As stated above, this packing is carried beyond the point ordinarily required in order that in the subsequent steps the sand therein may not settle away from the pattern.

Figure 2:
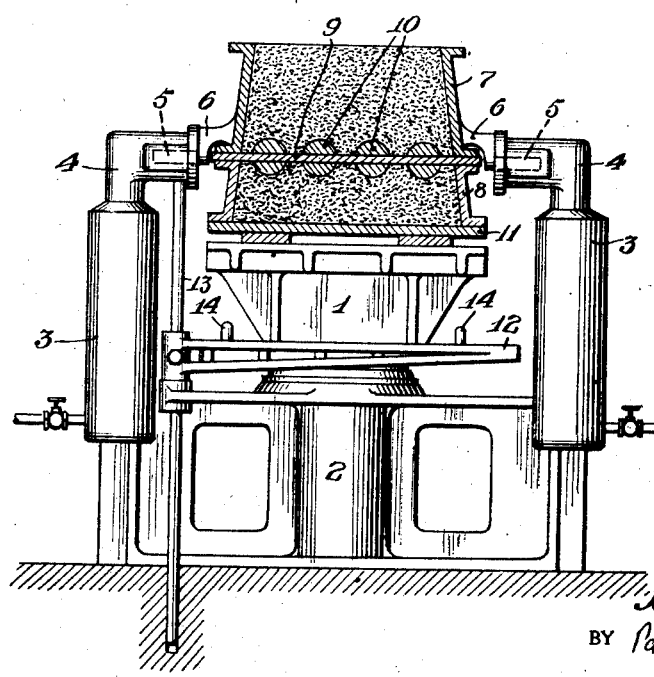
Fig. 2 is a similar view of the same parts showing the flask in normal position.

After being packed a bottom board 11 is secured to the drag, the flask raised by the pistons 4, turned over and again lowered until such board rests upon the table 1, as shown in Fig. 2. The cope member 7 is then supplied with sand and the flask again jolted until the sand in the cope is packed.

After this is done the cope and drag members are unlocked or released from each other and the cope member raised by the pistons 4, to a height sufficient to raise a frame 12, carried by a rod or bar 13, secured to one of the piston heads, from a position normally below the flask to a point well above the drag member as shown in Fig. 3.

This frame carries pins 14, which are in such position that when the frame is raised they will engage with the projecting edges of the pattern plate 9 and lift said plate from the drag. The frame is of sufficient size to pass over the sides and ends of the drag flask member, but the pattern plate extends out beyond the widest part of the drag, so as to be engaged by the pins 14 on the frame 12.

After the pattern has been lifted free of the drag the frame 12 is swung to one side and the cope member lowered onto the drag. Then by a slight jarring the cope may be loosened from the sand and lifted off, and in the same way the drag may be lifted off, leaving only the sand. This is removed by and with the board 11, and placed on the ground, when the machine may be at once used to make another mold from the same flask.

Sand molds of this kind have heretofore been made by hand ramming and it is unnecessary to further explain how they are utilized for producing the castings.

The above described process is the only one known in this art by which a plurality of molds and castings may be obtained from a single flask by means of a jolt machine. It manifestly means a very great saving in the cost of castings, mainly due to the perfection of the molds and the accuracy of the castings.

What I claim is:

1. The process of making a plurality of sand molds from a single flask by means of matched pattern plates and a jolt molding machine, which consists in placing the assembled cope and drag members of a flask with an interposed matched pattern plate on the machine in an inverted position, supplying mold material such as sand to the drag member and packing or jolting it to an abnormal degree, closing with a board the drag member, then inverting the flask and packing the cope member, then separating the two members and removing the pattern plate, then reassembling the two members and removing from the sand mold the cope and drag members, and removing the sand mold on the drag board from the table of the machine.

2. In the process of making a plurality of sand molds from a single flask by means of matched pattern plates and a jolt machine, the step which consists in packing the two members of an assembled flask with the interposed pattern plate on the machine, but jolting or packing the first member of such flask to an abnormal extent, so as to prevent the sand therein from settling away from the pattern plate while the other member is being packed.

3. In the process of making a plurality of sand molds from a single flask by means of a matched pattern plate and a jolt machine, the steps which consist in placing a flask composed of assembled and interlocked cope and drag members with an interposed pattern plate on the machine in an inverted position, with the drag member uppermost, packing the drag member until the sand is sufficiently solidified to prevent it from settling away from the pattern plate in the subsequent operations, and then turning the flask to normal position and packing the cope member.

4. The process of making a plurality of sand molds from a single flask by the use of a matched pattern plate and a jolt machine, which consists in packing first one member until the sand is sufficiently solidified to prevent it from settling away from the pattern plate in the subsequent operation, and then inverting and packing the other member of a flask with an interposed pattern plate between the two members, removing the flask members and the pattern plate from the packed sand mold and removing the latter from the machine.

In testimony whereof I hereto affix my signature.

JOHN R. WOOD.